United States Patent
Zhang

(10) Patent No.: US 11,272,049 B2
(45) Date of Patent: Mar. 8, 2022

(54) METHOD AND DEVICE FOR ACTIVATING OPERATING SYSTEM OF MOBILE TERMINAL

(71) Applicant: XI'AN ZHONGXING NEW SOFTWARE CO., LTD., Xi'An (CN)

(72) Inventor: Xiaoliang Zhang, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 171 days.

(21) Appl. No.: 16/637,397

(22) PCT Filed: Apr. 25, 2018

(86) PCT No.: PCT/CN2018/084457
§ 371 (c)(1),
(2) Date: Feb. 7, 2020

(87) PCT Pub. No.: WO2019/029194
PCT Pub. Date: Feb. 14, 2009

(65) Prior Publication Data
US 2021/0368037 A1    Nov. 25, 2021

(30) Foreign Application Priority Data
Aug. 8, 2017  (CN) .......................... 201710672148.3

(51) Int. Cl.
*H04B 1/38*    (2015.01)
*H04M 1/72463*    (2021.01)
(Continued)

(52) U.S. Cl.
CPC .......... *H04M 1/72463* (2021.01); *H04M 1/67* (2013.01); *H04M 1/72454* (2021.01); *H04M 2250/12* (2013.01)

(58) Field of Classification Search
CPC .......... H04M 1/72463; H04M 1/72454; H04M 1/67; H04M 1/0247; H04M 1/72519;
(Continued)

(56) References Cited

U.S. PATENT DOCUMENTS 10,019,052 B2   7/2018  Lee et al.
2012/0151374 A1  6/2012  Liu
(Continued)

FOREIGN PATENT DOCUMENTS

CN    104123113 A    10/2014
CN    105939425 A    9/2016
(Continued)

OTHER PUBLICATIONS

WIPO, International Search Report dated Jun. 27, 2018.
(Continued)

*Primary Examiner* — Temica M Beamer
(74) *Attorney, Agent, or Firm* — Cantor Colburn LLP

(57) ABSTRACT

A method and a device for activating an operating system of a mobile terminal. The method includes steps of: activating, when a gravity sensor provided on a first display screen of the mobile terminal is in a first state, a first operating system of the mobile terminal corresponding to a first display screen to illuminate the first display screen; activating, when the gravity sensor is in a second state, a second operating system of the mobile terminal corresponding to a second display screen to illuminate the second display screen.

18 Claims, 4 Drawing Sheets

---

Activate a first operating system of the mobile terminal corresponding to the first display screen to illuminate the first display screen when a gravity sensor provided on a first display screen of the mobile terminal is in a first state  ⟶ S202

Activate a second operating system of the mobile terminal corresponding to the second display screen to illuminate the second display screen when the gravity sensor is in the second state  ⟶ S204

(51) Int. Cl.
*H04M 1/72454* (2021.01)
*H04M 1/67* (2006.01)

(58) Field of Classification Search
CPC ........... H04M 1/72547; H04M 1/0237; H04M 1/72522; H04M 1/0216; H04M 1/0214; H04M 1/72583; H04M 1/23; H04M 1/0245; H04M 2250/12; H04M 2250/16; H04W 88/02
USPC ...... 455/418, 550.1, 566, 575.1, 575.3, 90.3
See application file for complete search history.

(56) References Cited

U.S. PATENT DOCUMENTS

| | | | |
|---|---|---|---|
| 2012/0154265 A1 | 6/2012 | Kim | |
| 2016/0014264 A1* | 1/2016 | Yim | G06F 1/3234 455/411 |
| 2016/0212256 A1* | 7/2016 | Gan | G06F 1/1686 |
| 2017/0351297 A1* | 12/2017 | Kim | H05K 5/02 |

FOREIGN PATENT DOCUMENTS

| | | |
|---|---|---|
| CN | 106155325 A | 11/2016 |
| CN | 106210279 A | 12/2016 |
| CN | 106254628 A | 12/2016 |
| CN | 106357880 A | 1/2017 |
| CN | 106708456 A | 5/2017 |
| JP | 2002108485 A | 4/2002 |
| JP | 2013218696 A | 10/2013 |
| JP | 2016158250 A | 9/2016 |

OTHER PUBLICATIONS

Japan Patent Office, First Office Action dated Feb. 24, 2021 for application No. JP2020-502966.
China Patent Office, Second Office Action dated Apr. 16, 2021 for application No. CN201710672148.3.
China Patent Office, First Office Action dated Sep. 18, 2020 for application No. CN201710672148.3.

* cited by examiner

METHOD AND DEVICE FOR ACTIVATING OPERATING SYSTEM OF MOBILE TERMINAL

TECHNICAL FIELD

The present disclosure relates to the technical field of communications, and in particular, to a method and a device for activating operating system of a mobile terminal.

BACKGROUND

The foldable dual-screen mobile phone is known in which two screens of the same size are provided. The two screens can be folded in half or folded back to back, and the two screens can be combined into a large screen for displaying when unfolded or be used as a single screen when folded.

In addition, the mobile phone with a fingerprint unlocking function and an operating system is known in which some applications in the operating system are encrypted, and these encrypted applications can only be seen after being decrypted by one fingerprint after the system is entered with another fingerprint. This method requires a user to encrypt the applications. However, the operation process is complicated and a process of identifying different fingerprints is also required.

SUMMARY

According to an embodiment of the present disclosure, there is provided a method for activating operating system of a mobile terminal, including: activating, when a gravity sensor provided on a first display screen of the mobile terminal is in a first state, a first operating system of the mobile terminal corresponding to the first display screen to illuminate the first display screen, wherein the gravity sensor is in the first state when an included angle between the gravity direction and a z-axis direction is greater than or equal to 90 degrees and smaller than or equal to 180 degrees, and a direction of the first display screen from a back of the screen to a front of the screen is defined as the z-axis direction; and activating, when the gravity sensor is in a second state, a second operating system of the mobile terminal corresponding to a second display screen to illuminate the second display screen, wherein the gravity sensor is in the second state when the included angle between the gravity direction and the z-axis direction is greater than or equal to 0 degree and smaller than 90 degrees.

According to still another embodiment of the present disclosure, there is also provided a device of activating operating system of a mobile terminal, including: a first activation module configured to, when a gravity sensor provided on a first display screen of the mobile terminal is in a first state, activate a first operating system of the mobile terminal corresponding to the first display screen to illuminate the first display screen, wherein the gravity sensor is in the first state when an included angle between the gravity direction and a z-axis direction is greater than or equal to 90 degrees and smaller than or equal to 180 degrees, and a direction of the first display screen from a back the screen to a front of the screen is defined as the z-axis direction; and a second activation module configured to, when the gravity sensor is in a second state, activate a second operating system of the mobile terminal corresponding to the second display screen to illuminate the second display screen, wherein the gravity sensor is in the second state when the included angle between the gravity direction and the z-axis direction is greater than or equal to 0 degree and smaller than 90 degrees.

According to still yet another embodiment of the present disclosure, there is also provided a storage medium storing a program, wherein the above method is implemented when the program is operated.

According to still yet another embodiment of the present disclosure, there is also provided a processor for operating a program, wherein the above method is implemented when the program is operated.

BRIEF DESCRIPTION OF THE DRAWINGS

The drawings illustrated herein are intended to provide a better understanding of the present disclosure and constitute a part of the present disclosure. The exemplary embodiments of the present disclosure and the description thereof are provided to explain the present disclosure and will not constitute an improper limitation to the present disclosure. In the drawings.

DETAILED DESCRIPTION

Hereinafter, the present disclosure will be described in detail with reference to the drawings and in conjunction with the embodiments. It should be noted that, in the case of non-conflict, the embodiments in the present application and the features in the embodiments could be combined with each other.

It should be noted that the terms "first", "second" and the like in the description, the claims and the above-mentioned drawings of the present disclosure are used to distinguish similar objects and are not necessarily used to describe a specific order or sequence.

First Embodiment

Figure 1:
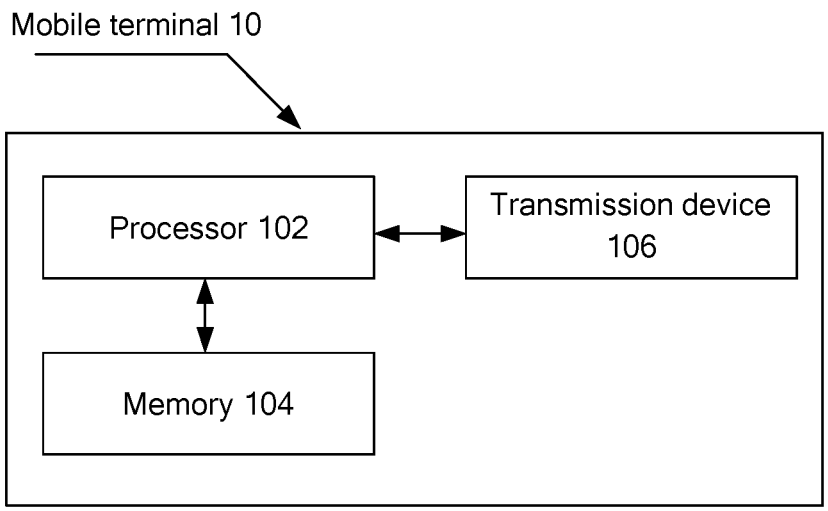
FIG. 1 is a block diagram of a hardware structure of the mobile terminal corresponding to a method for activating operating system of a dual-screen mobile terminal according to an embodiment of the disclosure.

The process embodiment provided in the first embodiment of the present application may be applied to mobile terminals such as a mobile phone, a tablet computer and a portable game machine. FIG. 1 is a block diagram of a hardware structure of the mobile terminal corresponding to a method for activating operating system of a dual-screen mobile terminal according to an embodiment of the disclosure. As shown in FIG. 1, a mobile terminal 10 may include one or two (only one in the figure) processors 102 (the processor 102 may include but is not limited to a processing device such as a microprocessor MCU or a programmable logic device FPGA), a memory 104 for storing data and a transmission device 106 for communication function. An ordinary person skilled in the art may understand that the structure as shown in FIG. 1 is only exemplary and does not restrict the structure of the above electronic device. For example, the mobile terminal 10 may further include more or less components than those shown in FIG. 1 or have a configuration different from that shown in FIG. 1.

The memory 104 may be configured to store software programs and modules of application software, such as a program instruction or module corresponding to the method of activating operating system of the dual-screen mobile terminal in the embodiment of the present disclosure; the processor 102 executes various functional applications and data processing, i.e., perform the aforementioned method, by running the software programs and modules stored in the memory 104. The memory 104 may include a high-speed random access memory and may further include a non-volatile memory, such as one or two magnetic storage devices, a flash memory or other non-volatile solid-state memory. In some examples, the memory 104 may further include memories remotely disposed with respect to the processor 102, and these remote memories may be connected to the mobile terminal 10 via a network. Examples of the above network include, but are not limited to, the Internet, intranet, local area network, mobile communication network and combinations thereof.

The transmission device 106 is configured to receive or transmit data via a network. A specific example of the above network may include a wireless network provided by a communication provider of the mobile terminal 10. In one example, the transmission device 106 includes a Network Interface Controller (NIC) which can be connected to other network apparatuses through a base station so as to communicate with the Internet. In one example, the transmission device 106 may be a radio frequency (RF) module which is configured to communicate with the Internet wirelessly.

Figure 2:
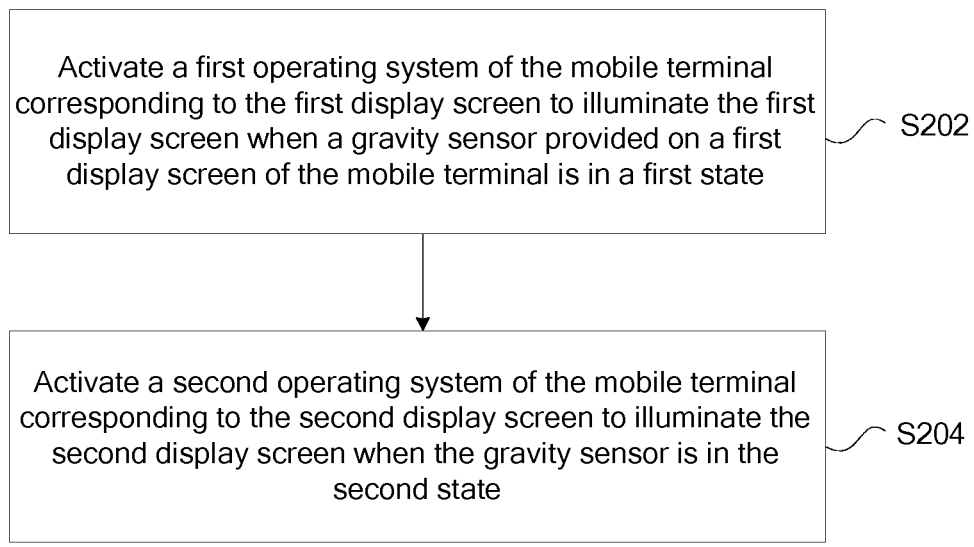
FIG. 2 is a flowchart of a method for activating operating system of a dual-screen mobile terminal according to an embodiment of the disclosure.

In this embodiment, there is provided a method for activating an operating system of a dual-screen mobile terminal running on the mobile terminal FIG. 2 is a flowchart of a method for activating an operating system of a dual-screen mobile terminal according to an embodiment of the present disclosure. As shown in FIG. 2, the method includes steps of:

Step S202: activating a first operating system of a mobile terminal corresponding to a first display screen to illuminate the first display screen when a gravity sensor provided on the first display screen of the mobile terminal is in a first state, wherein the gravity sensor is in the first state when an included angle between the gravity direction and a z-axis direction is greater than or equal to 90 degrees and smaller than or equal to 180 degrees, and a direction of the first display screen from a back of the screen to a front of the screen is defined as the z-axis direction;

Step S204: activating a second operating system of the mobile terminal corresponding to a second display screen to illuminate the second display screen when the gravity sensor is in a second state, wherein the gravity sensor is in the second state when the included angle between the gravity direction and the z-axis direction is greater than or equal to 0 degree and smaller than 90 degrees.

Through the above steps, the dual-screen mobile terminal (such as a dual-screen mobile phone) with two operating systems can activate corresponding operating systems according to different states of the gravity sensor to achieve the effect of automatically entering different operating systems. In such a manner, a user can conveniently distinguish the states of life and work or the states of daily life and privacy thereby improving the operation experience of dual-screen mobile phones in different application scenarios.

In an embodiment, the above steps S202 and S204 may be performed simultaneously, and before the step S202, the method may further include: judging whether the gravity sensor is in the first state or the second state.

In an embodiment, the method further includes: converting, when detecting that the first display screen and the second display screen enter an unfolded state from a folded state, the mobile terminal from the current first display screen or the second display screen to a dual-screen display. Herein, the operating system corresponding to the dual-screen display is the operating system corresponding to a display screen that has been displayed before the conversion. In other words, if the display screen (current display screen) displayed before the conversion is the first display screen, the operating system corresponding to the dual-screen display is the first operating system corresponding to the first display screen, and if the display screen displayed before the conversion is the second display screen, the operating system corresponding to the dual-screen display is the second operating system corresponding to the second display screen.

In an embodiment, there is provided a distance sensor configured to detect a distance between the first display screen and the second display screen on the first display screen. It is determined that the first display screen and the second display screen are in the folded state when the distance between the second display screens becomes smaller and it is determined that the first display screen and the second display screen are in the unfolded state when the distance between the first display screen and the second display screen becomes larger. In an embodiment the distance sensor may be a Hall device; in another embodiment, a magnet corresponding to the Hall device is provided on the second display screen; in still another embodiment, the distance sensors are provided on the first display screen and the second display screen, respectively, and the two sensors cooperate with each other to detect the distance between the first display screen and the second display screen.

In an embodiment, in a case where the first display screen and the second display screen are in the unfolded state, the step of illuminating the first display screen in the step S202 further includes illuminating the second display screen while illuminating the first display screen so as to enter a dual-screen display mode corresponding to the first operating system; and the step of illuminating the second display screen in the step S202 further includes illuminating the first display screen while illuminating the second display screen so as to enter a dual-screen display mode corresponding to the second operating system.

In an embodiment, data generated by the operation is stored in a first storage area when the gravity sensor is in the first state; data generated by the operation is stored in a second storage area when the gravity sensor is in the second state. Herein, the first operating system corresponds to the first storage area and the second operating system corresponds to the second storage area.

In an embodiment, a fingerprint identification module is provided on a side of the mobile terminal. Fingerprint data collected by the fingerprint identification module is stored in a fingerprint data storage area of the first storage area when the gravity sensor is in the first state; the fingerprint data collected by the fingerprint identification module is stored in a fingerprint data storage area of the second storage area when the gravity sensor is in the second state. In this case, in the above step S202, the fingerprint data identified by the fingerprint identification module is matched with fingerprint data stored in the first storage area when the gravity sensor is in the first state, and the first operating system corresponding to the first display screen is activated to illuminate the first display screen if the matching is successful; the fingerprint data identified by the fingerprint identification module is matched with the fingerprint data stored in the second storage area when the gravity sensor is in the second state, and the second operating system corresponding to the second display screen is activated to illuminate the second display screen if the matching is successful.

In an embodiment, it is judged whether the gravity sensor is in the first state or the second state when the mobile terminal wakes up from a standby state.

In an embodiment, the first display screen and the second display screen are connected through a rotation shaft.

Figure 3:
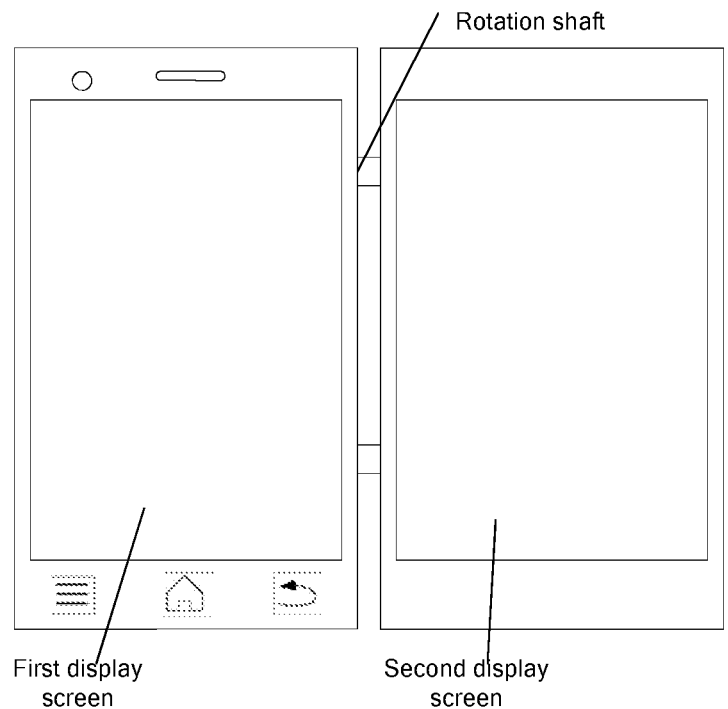
FIG. 3 is a schematic diagram of a dual-screen mobile terminal according to an embodiment of the present disclosure.

FIG. 3 is a schematic diagram of a dual-screen mobile terminal according to an embodiment of the present disclosure. As shown in FIG. 3, the dual-screen mobile terminal is a dual-screen mobile phone which has two display screens with the same size and specifications. The display screen has a touch screen. After the dual-screen mobile phone is unfolded, the two screens are placed side by side and are divided into left and right screens, namely, the first screen and the second screen. The two screens are connected by a rotation shaft. The two screens can be folded back-to-back and are unfolded at left and right sides by the rotation shaft.

Figure 4:
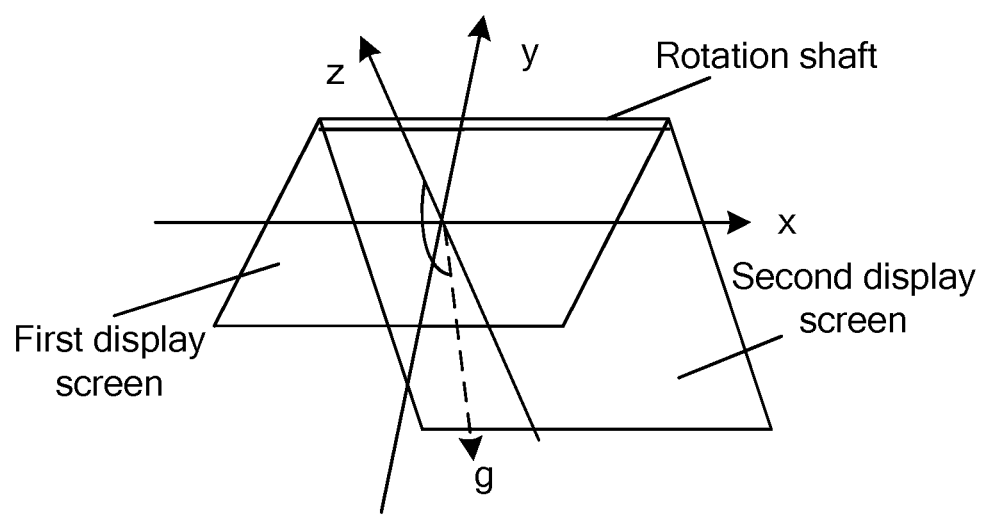
FIG. 4 is a schematic diagram of another dual-screen mobile terminal according to an embodiment of the present disclosure.

FIG. 4 is a schematic diagram of another dual-screen mobile terminal according to an embodiment of the present disclosure. As shown in FIG. 4, the dual-screen mobile terminal is actually a foldable mobile phone with a single screen. The mobile phone is displayed as a complete screen after unfolded and the screen of the mobile phone is divided into two back-to-back parts after folded. The front and back parts of the screen are of the same size and specifications and can be regarded as two display screens.

The gravity sensor is provided on the first display screen. In the present disclosure, the wording "provided on the first display screen" includes a case where gravity sensor or distance sensor is not directly connected to the first display screen but maintains a fixed positional relationship and directional relationship with respect to the first display screen. The detected state (first state or second state) of the gravity sensor represents the state of the first display screen. The gravity sensor may be a gravity acceleration sensor.

In the present disclosure, the direction from the back to the front of the first display screen is defined as the z-axis direction. In other words, the z-axis direction is a direction where the first display screen is facing and is perpendicular to the first display screen. The first state is a state when the included angle between the gravity direction and the z-axis direction is greater than or equal to 90 degrees and smaller than or equal to 180 degrees, and the second state is a state when the included angle between the gravity direction and the z-axis direction is greater than or equal to 0 degree and smaller than 90 degrees.

The Hall device (as an example of the distance sensor) and the magnet are provided on the first display screen and the second display screen, respectively. Whether the mobile phone is positioned in a dual-screen folded state or an unfolded state can be determined by moving the Hall device to or away from the magnet. The current folded or unfolded state can be recorded in a status register. In the folded state, the Hall device is close to the magnet, and the two display screens are folded back to back in the folded state; in the unfolded state, the Hall device is moved away from the magnet, and the two display screens are positioned in the unfolded state.

The dual-screen mobile phone has two operating systems, in which a first display screen corresponds to the first operating system and a second display screen corresponds to the second operating system. In the present disclosure, the first operating system and the second operating system may correspond to states of life mode and work mode, respectively or may correspond to states of daily life mode and privacy mode, respectively.

In an embodiment, the gravity sensor is determined whether it is in the first state or the second state when the mobile phone is woken up from the standby state.

When the mobile phone is in the folded state, the first operating system is activated to illuminate the first display when the gravity sensor is in the first state; and the second operating system is activated to illuminate the second display screen when the gravity sensor is in the second state.

When the phone is in the unfolded state, the first operating system is activated to illuminate the first display and the second display screen to enter the dual-screen display mode corresponding to the first operating system when the gravity sensor is in the first state; and the second operating system is activated to illuminate the first display screen and the second display screen at the same time so as to enter the dual-screen display mode corresponding to the second operating system when the gravity sensor is in the second state.

In an embodiment, when the mobile phone enters the unfolded state from the folded state, the mobile phone enters a dual-screen display from a current single-screen display. Herein, the operating system corresponding to the dual-screen display is the current operating system (i.e., the operating system before unfolded).

In an embodiment, the mobile phone may be provided with two storage areas, in which the first operating system corresponds to the first storage area and the second operating system corresponds to the second storage area.

In an embodiment, when the gravity sensor is in the first state, the data generated by the mobile phone operation is stored in the first storage area; when the gravity sensor is in the second state, the data generated by the mobile phone operation is stored in the second storage area.

In another embodiment, the first operating system and the second operating system may be provided with a public storage area and a respective dedicated storage area.

Figure 5:
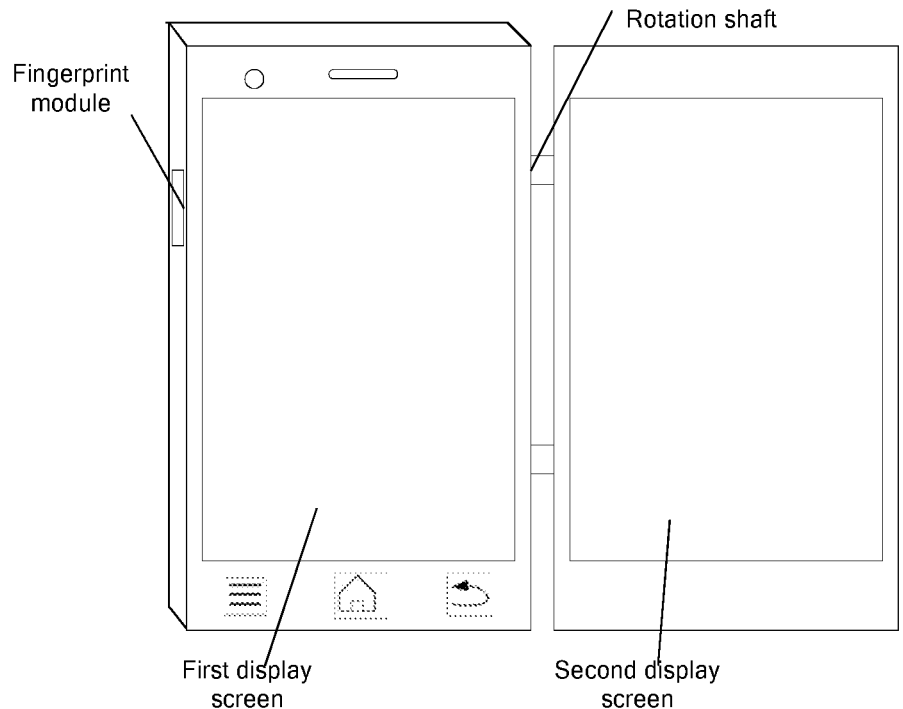
FIG. 5 is a schematic diagram of another dual-screen mobile terminal according to an embodiment of the present disclosure.

FIG. 5 is a schematic diagram of another dual-screen mobile terminal according to an embodiment of the present disclosure. As shown in FIG. 5, a fingerprint module, that is, a fingerprint identification module is disposed on the side of the mobile phone. When the gravity sensor is in the first state, fingerprint data collected by the fingerprint identification module is stored in a fingerprint data storage area of the first storage area, and the identified fingerprint data is matched with fingerprint data stored in the first storage area. If the matching is successful, the first operating system corresponding to the first display screen is activated to illuminate the first display screen; when the gravity sensor is in the second state, the fingerprint data collected by the fingerprint identifying module is stored in a fingerprint data storage area of the second storage area and the identified fingerprint data is matched with fingerprint data stored in the second storage area. If the matching is successful, the second operating system corresponding to the second display screen is activated to illuminate the second display screen.

Figure 6:
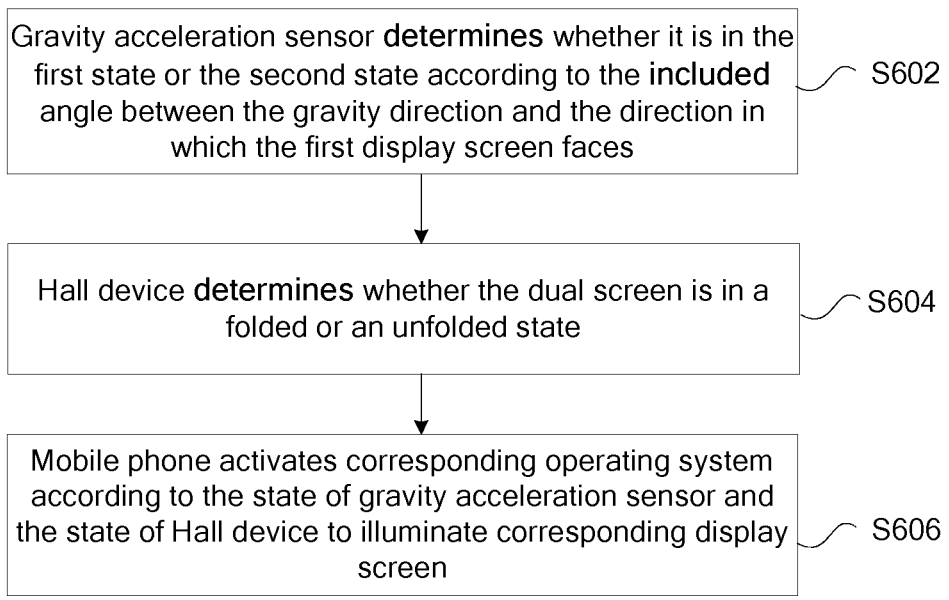
FIG. 6 is a flowchart of a method for activating operating system of a dual-screen mobile terminal according to an embodiment of the present disclosure.

FIG. 6 is a flowchart of a method for activating an operating system of a dual-screen mobile terminal according to an embodiment of the present disclosure. As shown in FIG. 6, the method includes steps of:

Step S602, a gravity acceleration sensor determines whether it is in the first state or the second state according to an included angle between the gravity direction and a direction (i.e., a z-axis direction) in which the first display screen faces;

Step S604, the Hall device determines whether the dual screen (the first display screen and the second display screen) is in a folded or an unfolded state;

Step S606: the mobile phone activates a corresponding operating system according to a state of the gravity acceleration sensor and a state of the Hall device to illuminate a corresponding display screen.

Through the description of the above embodiments, those skilled in the art can clearly understand that the method according to the above embodiments can be implemented by means of software plus a necessary universal hardware platform, or of course possibly implemented by hardware, but the former is preferable in many cases. Based on such understanding, the part of the technical solution of the present disclosure that is essential or contributes to the prior art can be embodied in the form of a software product. The computer software product is stored in a storage medium (such as ROM/RAM, magnetic disk, the optical disc), including a plurality of instructions for a terminal device (which may be a mobile phone, a computer, a server, or a network device, etc.) to execute the methods described in the embodiments of the present disclosure.

EXAMPLE 2

In the present embodiment, there is further provided a device of activating an operating system of a dual-screen mobile terminal. The device is configured to implement the foregoing embodiments and preferred embodiments, and the descriptions thereof will be omitted herein. The term "module" as used below may implement a combination of software and/or hardware for a predetermined function. Although the devices described in the following embodiments are preferably implemented in software, implementation in hardware or a combination of software and hardware is also possible and conceived.

Figure 7:
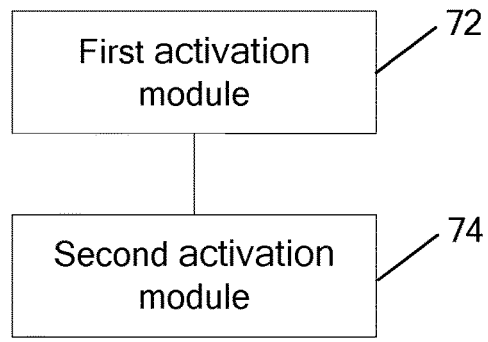
FIG. 7 is a block diagram of a device of activating operating system of a dual-screen mobile terminal according to an embodiment of the present disclosure.

FIG. 7 is a block diagram of a device of activating an operating system of a dual-screen mobile terminal according to an embodiment of the present disclosure. As shown in FIG. 7, the device includes: a first activation module 72 and a second activation module 74.

The first activation module 72 is configured to, when a gravity sensor provided on a first display screen of a mobile terminal is in a first state, activate a first operating system of the mobile terminal corresponding to the first display screen to illuminate the first display screen, wherein the gravity sensor is in the first state when an included angle between the gravity direction and a z-axis direction is greater than or equal to 90 degrees and smaller than or equal to 180 degrees and a direction of the first display screen from a back of the screen to a front of the screen is defined as the z-axis direction; and The second activation module 74 configured to, when the gravity sensor is in a second state, activate a second operating system of the mobile terminal corresponding to the second display screen to illuminate the second display screen, wherein the gravity sensor is in the second state when the included angle between the gravity direction and the z-axis direction is greater than or equal to 0 degree and smaller than or equal to 90 degrees.

In an embodiment, the device further includes: a determination module configured to determine whether the first display screen and the second display screen are in the folded state or the unfolded state by a detection result of a distance sensor provided on the first display screen, wherein when the distance sensor detects that the distance between the first display screen and the second display screen becomes smaller, the determination module determines that the first display screen and the second display screen are in the folded state; when the distance sensor detects that the distance between the first display screen and the second display screen becomes larger, the determination module determines that the first display screen and the second display screen are in the unfolded state.

Figure 8:
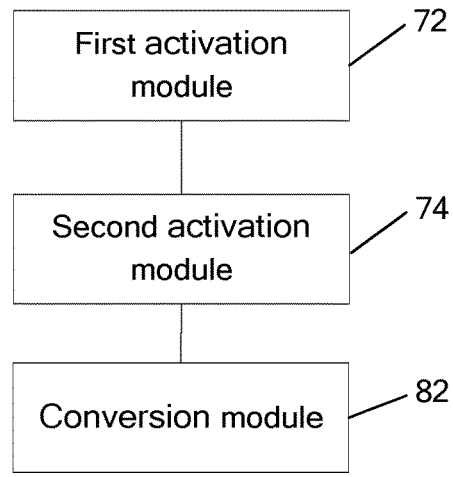
FIG. 8 is a block diagram of a device of activating operating system of a dual-screen mobile terminal according to a preferable embodiment of the present disclosure.

FIG. 8 is a structural block diagram of a device of activating an operating system of a dual-screen mobile terminal according to a preferable embodiment of the present disclosure. As shown in FIG. 8, in addition to the modules in FIG. 7, the device further includes: a conversion module 82.

The conversion module 82 is configured to convert the mobile terminal from a current first or second display screen display mode to a dual-screen display mode when the first display screen and the second display screen enter the unfolded state from the folded state and the operating system corresponding to the dual-screen display mode is an operating system corresponding to the display screen displayed before the conversion.

In an embodiment, the first activation module is further configured to, in a case where the first display screen and the second display screen are in an unfolded state, activate the first operating system when the gravity sensor is in the first state to illuminate the first display screen and the second display screen at the same time so as to enter a dual-screen display mode corresponding to the first operating system; and the second activation module is further configured to: in a case where the first display screen and the second display screen are in an unfolded state, activate the second operating system to illuminate the second display screen and the first display screen when the gravity sensor is in the second state so as to enter the dual-screen display mode corresponding to the second operating system.

In an embodiment, the device further includes: a first storage module configured to, when the gravity sensor is in the first state, store data generated by the operation in a first storage area; and a second storage module configured to, when the gravity sensor is in the second state, store data generated by the operation in a second storage area. Herein, the first operating system corresponds to the first storage area and the second operating system corresponds to the second storage area.

In an embodiment, the device further includes a fingerprint identification module disposed on a side of the mobile terminal. When the gravity sensor is in the first state, fingerprint data collected by the fingerprint identification module is stored in a fingerprint data storage area of the first storage area and when the gravity sensor is in the second state, the fingerprint data collected by the fingerprint identification module is stored in a fingerprint data storage area of the second storage area.

In this case, the first activation module is further configured to, when the gravity sensor is in a first state, match the fingerprint data identified by the fingerprint identification module with fingerprint data stored in the first storage area, and activate the first operating system corresponding to the first display screen to illuminate the first display screen if the matching is successful; and the second activation module is further configured to, when the gravity sensor is in the second state, match the fingerprint data identified by the fingerprint identification module with fingerprint data stored in the second storage area and activate the second operating system corresponding to the second display screen to illuminate the second display screen if the matching is successful.

In an embodiment, the device further includes a judgment module configured to judge whether the gravity sensor is in the first state or the second state.

In an embodiment, the judgment module is configured to judge whether the gravity sensor is in the first state or the second state when the mobile terminal wakes up from a standby state.

In an embodiment, the first display screen and the second display screen are connected through a rotation shaft.

Figure 9:
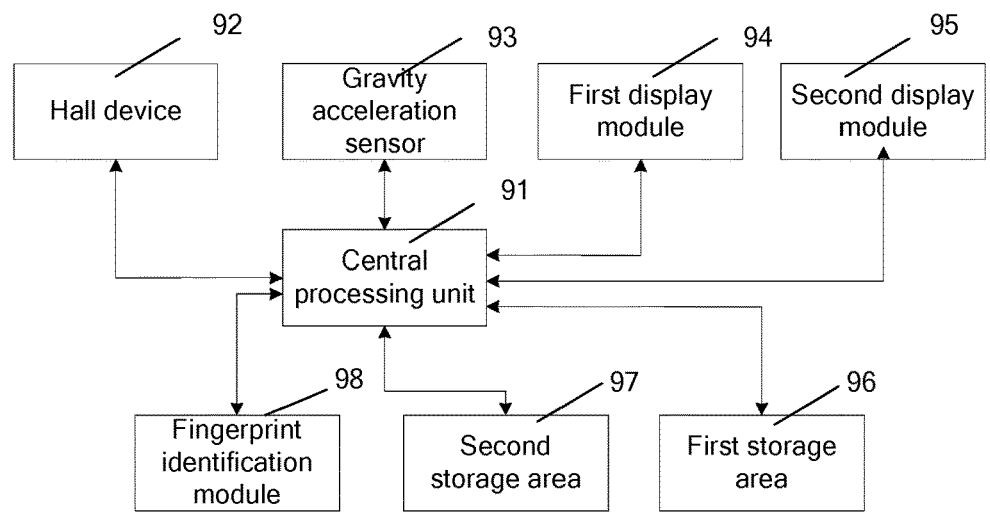
FIG. 9 is a block diagram of a mobile terminal according to an embodiment of the present disclosure.

FIG. 9 is a block diagram of the mobile terminal according to an embodiment of the present disclosure. As shown in FIG. 9, the mobile terminal according to the embodiment of the present disclosure includes a central processing unit 91, a Hall device 92, a gravity acceleration sensor 93, a first display module 94, a second display module 95, a second storage area 96, a second storage area 97, a fingerprint identification module 98 and other components. These modules will be briefly described hereinafter.

The central processing unit 91 is configured to control the Hall device 92, the gravity acceleration sensor 93, the second display module 94, the second display module 95, the first storage area 96, the second storage area 97 and the fingerprint identification module 98.

The Hall device 92 and the magnet are respectively disposed on the first display screen and the second display screen. Whether the mobile phone is positioned in a dual-screen folded state or an unfolded state can be determined by moving the Hall device to or away from the magnet. As shown in FIG. 4, the current folded state or unfolded state can be recorded in a status register.

In an embodiment, in the folded state, the Hall device is close to the magnet and the two display screens are folded back to back; in the unfolded state, the Hall device is moved away from the magnet and the two display screens are positioned in the unfolded state.

The gravity sensor 93 is provided on the first display screen. As shown in FIG. 4, the direction from the back to the front of the first display screen is defined as the z-axis direction. The first state is a state when an included angle between the gravity direction and the z-axis direction is greater than or equal to 90 degrees and smaller than or equal to 180 degrees, and the second state is a state when the included angle between the gravity direction and the z-axis direction is greater than or equal to 0 degree and smaller than 90 degrees.

The first display module 94 is connected to the first display screen, and the first display module sends the display data to the first display screen for display.

The second display module 95 is connected to the second display screen, and the second display module sends the display data to the second display screen for display.

A dual-screen mobile phone has two operating systems, in which a first display screen corresponds to the first operating system and a second display screen corresponds to the second operating system.

In an embodiment, it is determined whether the gravity sensor 93 is in the first state or the second state when the mobile phone wakes up from the standby state.

When the mobile phone is in the folded state, the first operating system is activated to illuminate the first display screen when the gravity sensor 93 is in the first state and the second operating system is activated to illuminate the second display when the gravity sensor 93 is in the second state.

In an embodiment, the mobile phone enters the dual-screen display from the current single-screen display when the mobile phone enters a folded state from an unfolded state. Herein, the operating system corresponding to the dual-screen display is the current operating system (i.e., the operating system before unfolded).

When the mobile phone is in the unfolded state, the first operating system is activated to illuminate the first display screen and the second display screen to enter the dual-screen display mode corresponding to the first operating system when the gravity sensor 93 is in the first state; the second operating system is activated to illuminate the second display screen and the first display screen to enter the dual-screen display mode corresponding to the second operating system when the gravity sensor 93 is in the second state.

The first storage area 96 stores data generated by the first operating system.

The second storage area 97 stores data generated by the second operating system.

The fingerprint identification module 98 may be disposed on the side of the mobile phone and stores fingerprint data in the first storage area 96 or the second storage area 97 according to the state of the gravity acceleration sensor; and the identified fingerprint data is matched with fingerprint data in the first storage area 96 or the second storage area 97, respectively, as shown in FIG. 5.

It should be noted that the above modules can be implemented by software or hardware. For the latter, it can be implemented by the following methods but not limited to: the above modules being located in the same processor or the above modules being located in different processors in arbitrary combinations.

EXAMPLE 3

The embodiment of the present disclosure further provides a storage medium storing a program, wherein any one of the above methods is executed when the program is operated.

In an implementation, in this embodiment, the above storage medium may be configured to store program code for performing steps of:

Step S11: activating a first operating system of a mobile terminal corresponding to a first display screen to illuminate the first display screen when a gravity sensor provided on the first display screen of the mobile terminal is in a first state, wherein the gravity sensor is in the first state when an included angle between the gravity direction and a z-axis direction is greater than or equal to 90 degrees and smaller than or equal to 180 degrees, and a direction of the first display screen from a back of the screen to a front of the screen is defined as the z-axis direction;

Step S12: activating a second operating system of the mobile terminal corresponding to a second display screen to illuminate the second display screen when the gravity sensor is in a second state, wherein the gravity sensor is in the second state when the included angle between the gravity direction and the z-axis direction is greater than or equal to 0 degree and smaller than 90 degrees.

In an implementation, in this embodiment, the above storage medium may include, but not be limited to, a USB drive, a Read-Only Memory (ROM), a Random Access Memory (RAM)), a mobile hard disk, a magnetic disk or a compact disc and other medium that can store program code.

EXAMPLE 4

An embodiment of the present disclosure further provides a processor for operating a program, wherein any one of the above methods is executed when the program is operated.

In an implementation, in this embodiment, the program is configured to perform steps of:

Step S21: activating a first operating system of a mobile terminal corresponding to a first display screen to illuminate the first display screen when a gravity sensor provided on the first display screen of the mobile terminal is in a first state, wherein the gravity sensor is in the first state when an included angle between the gravity direction and a z-axis direction is greater than or equal to 90 degrees and smaller than or equal to 180 degrees, and a direction of the first display screen from a back of the screen to a front of the screen is defined as the z-axis direction;

Step S22: activating a second operating system of the mobile terminal corresponding to a second display screen to illuminate the second display screen when the gravity sensor is in a second state, wherein the gravity sensor is in the second state when the included angle between the gravity direction and the z-axis direction is greater than or equal to 0 degree and smaller than 90 degrees.

In an implementation, for specific examples in this embodiment, reference may be made to the examples described in the above embodiments and implementations, which will not be described once more herein.

Obviously, it should be understood by those skilled in the art that the above-mentioned modules or steps of the present disclosure may be implemented by a general-purpose computing device, and they may be concentrated on a single computing device or distributed on a network composed of two computing devices. In an embodiment, they may be implemented in form of program codes executable by a computing device so that they may be stored in a storage device and executed by the computing device, and in some cases, they may be executed by steps in an different order as shown or described herein or they are separately made into individual integrated circuit modules, or two of the modules or steps are made into a single integrated circuit module for implementation. As such, the present disclosure is not limited to any particular combination of hardware and software. Described above are only preferred embodiments of the present disclosure and are not intended to limit the present disclosure. For those skilled in the art, various modifications and changes can be made. Any modifications, equivalents, or improvements made within the spirit and principle of the present invention should be included in the protection scope of the present invention.

What is claimed is:

1. A method for activating an operating system of a mobile terminal, comprising:
activating, when a gravity sensor provided on a first display screen of the mobile terminal is in a first state, a first operating system of the mobile terminal corresponding to the first display screen to illuminate the first display screen, wherein the gravity sensor is in the first state when an included angle between the gravity direction and a z-axis direction is greater than or equal to 90 degrees and smaller than or equal to 180 degrees, and a direction of the first display screen from a back of the screen to a front of the screen is defined as the z-axis direction; and
activating, when the gravity sensor is in a second state, a second operating system of the mobile terminal corresponding to a second display screen to illuminate the second display screen, wherein the gravity sensor is in the second state when the included angle between the gravity direction and the z-axis direction is greater than or equal to 0 degree and smaller than 90 degrees.

2. The method according to claim 1, further comprising:
converting, when detecting that the first display screen and the second display screen enter an unfolded state from a folded state, the mobile terminal from the current first display screen or the second display screen to a dual-screen display mode, wherein the operating system corresponding to the dual-screen display mode is the operating system corresponding to the display screen that has been displayed before the conversion.

3. The method according to claim 2, wherein
the first display screen is provided with a distance sensor configured to detect a distance between the first display screen and the second display screen;
the first display screen and the second display screen are determined to be in a folded state when detecting that the distance between the first display screen and the second display screen becomes smaller; and
the first display screen and the second display screen are determined to be in an unfolded state when detecting that the distance between the first display screen and the second display screen becomes larger.

4. The method according to claim 3, wherein in a case where the first display screen and the second display screen are in the unfolded state,
the step of illuminating the first display screen further comprising:
illuminating the second display screen while illuminating the first display screen, so as to enter the dual-screen display mode corresponding to the first operating system; and
the step of illuminating the second display screen further comprising:
illuminating the first display screen while illuminating the second display screen, so as to enter the dual-screen display mode corresponding to the second operating system.

5. The method according to claim 1, further comprising:
storing data generated by the operation in a first storage area when the gravity sensor is in the first state; and
storing data generated by the operation in a second storage area when the gravity sensor is in the second state, wherein the first operating system corresponds to the first storage area and the second operating system corresponds to the second storage area.

6. The method according to claim 5, wherein
a fingerprint identification module is provided on a side of the mobile terminal, fingerprint data collected by the fingerprint identification module is stored in a fingerprint data storage area of the first storage area when the gravity sensor is in the first state, and the fingerprint data collected by the fingerprint identification module is stored in a fingerprint data storage area of the second storage area when the gravity sensor is in the second state, wherein the step of activating the first operating system to illuminate the first display screen including:

matching the fingerprint data identified by the fingerprint identification module with fingerprint data stored in the first storage area and activating the first operating system corresponding to the first display screen to illuminate the first display screen if the matching is successful; and the step of activating the second operating system to illuminate the second display screen including:

matching the fingerprint data identified by the fingerprint identification module with fingerprint data stored in the second storage area and activating the second operating system to illuminate the second display screen if the matching is successful.

7. The method according to claim 1, further comprising: judging whether the gravity sensor is in the first state or the second state when the mobile terminal wakes up from a standby state.

8. The method according to claim 1, wherein the first display screen and the second display screen are connected through a rotation shaft.

9. A device of activating an operating system of a mobile terminal, comprising:

a first activation module configured to, when a gravity sensor provided on a first display screen of the mobile terminal is in a first state, activate a first operating system of the mobile terminal corresponding to the first display screen to illuminate the first display screen, wherein the gravity sensor is in the first state when an included angle between the gravity direction and a z-axis direction is greater than or equal to 90 degrees and smaller than or equal to 180 degrees, and a direction of the first display screen from a back the screen to a front of the screen is defined as the z-axis direction; and a second activation module configured to, when the gravity sensor is in a second state, activate a second operating system of the mobile terminal corresponding to the second display screen to illuminate the second display screen, wherein the gravity sensor is in the second state when the included angle between the gravity direction and the z-axis direction is greater than or equal to 0 degree and smaller than 90 degrees.

10. The device according to claim 9, further comprising:

a conversion module configured to, when the first display screen and the second display screen enter an unfolded state from a folded state, convert the mobile terminal from a current first or second display screen display mode to a dual-screen display mode, wherein the operating system corresponding to the dual-screen display mode is an operating system corresponding to the display screen displayed before the conversion.

11. The device according to claim 10, further comprising:

a determination module configured to determine whether the first display screen and the second display screen are in the folded state or the unfolded state by a detection result of a distance sensor provided on the first display screen, wherein when the distance sensor detects that the distance between the first display screen and the second display screen becomes smaller, the determination module determines that the first display screen and the second display screen are in the folded state; when the distance sensor detects that the distance between the first display screen and the second display screen becomes larger, the determination module determines that the first display screen and the second display screen are in the unfolded state.

12. The device according to claim 11, further comprising:

the first activation module is configured to, in a case where the first display screen is in the unfolded state, activate the first operating system when the gravity sensor is in the first state to illuminate the first display screen and the second display screen at the same time so as to enter a dual-screen display mode corresponding to the first operating system; and the second activation module is configured to, in a case where the first display screen and the second display screen are in the unfolded state, activate the second operating system to illuminate the second display screen and the first display screen when the gravity sensor is in the second state so as to enter the dual-screen display mode corresponding to the second operating system.

13. The device according to claim 9, further comprising:

a first storage module configured to, when the gravity sensor is in the first state, store data generated by the operation in a first storage area, the first operating system corresponding to the first storage area; and a second storage module configured to, when the gravity sensor is in the second state, store data generated by the operation in a second storage area, the second operating system corresponding to the second storage area.

14. The device according to claim 13, further comprising:

a fingerprint identification module disposed on a side of the mobile terminal, and configured to store fingerprint data collected by the fingerprint identification module in a fingerprint data storage area of the first storage area when the gravity sensor is in the first state and store the fingerprint data collected by the fingerprint identification module in a fingerprint data storage area of the second storage area when the gravity sensor is in the second state, wherein the first activation module is configured to match the fingerprint data identified by the fingerprint identification module with fingerprint data stored in the first storage area when the gravity sensor is in the first state and activate the first operating system corresponding to the first display screen to illuminate the first display screen if the matching is successful; and the second activation module is configured to match the fingerprint data identified by the fingerprint identification module with fingerprint data stored in the second storage area when the gravity sensor is in the second state and activate the second operating system corresponding to the second display screen to illuminate the second display screen if the matching is successful.

15. The device according to claim 9, further comprising:

a judgment module configured to judge whether the gravity sensor is in the first state or the second state.

16. The device according to claim 15, wherein the judging module is configured to judge whether the gravity sensor is in the first state or the second state when the mobile terminal wakes up from a standby state.

17. A non-transitory storage medium including a stored program, wherein the method according to claim 1 is implemented when the program is operated.

18. A processor configured to operate a program, wherein the method according claim 1 is implemented when the program is operated.

* * * * *